United States Patent [19]

Koenig et al.

[11] Patent Number: 5,445,578

[45] Date of Patent: Aug. 29, 1995

[54] HYDRAULIC CONTROL FOR A POWER TRANSMISSION WITH A MANUAL OVERRIDE

[75] Inventors: Melissa M. Koenig, Ann Arbor; William J. Vukovich, Ypsilanti, both of Mich.

[73] Assignee: General Motors Corporation, Detroit, Mich.

[21] Appl. No.: 169,784

[22] Filed: Dec. 17, 1993

[51] Int. Cl.[6] .............................................. B60K 41/06
[52] U.S. Cl. ................................... 477/142; 477/134; 477/137; 477/906
[58] Field of Search ............... 477/906, 907, 127, 134, 477/137, 142 OR; 475/123, 131, 132

[56] References Cited

U.S. PATENT DOCUMENTS 4,351,206  9/1982  Lemieux et al. .................. 477/134
4,541,308  9/1985  Person et al. .................. 477/127 X Primary Examiner—Charles A. Marmor
Assistant Examiner—Peter Kwon
Attorney, Agent, or Firm—Donald F. Scherer

[57] ABSTRACT

A hydraulic control for a power transmission has an electronically operated mode during normal operation. In the event of loss of electrical power, a power interrupt valve is operable in conjunction with a manual valve to direct fluid pressure to the proper devices as selected by the operator, thereby permitting operation to continue in a manual override mode.

2 Claims, 2 Drawing Sheets

HYDRAULIC CONTROL FOR A POWER TRANSMISSION WITH A MANUAL OVERRIDE

TECHNICAL FIELD

This invention relates to transmission controls, and more particularly, to manual ratio selection controls in automatic shifting power transmissions.

BACKGROUND OF THE INVENTION

Transmissions having electronic controls for ratio interchange generally have a backup system which will permit continued operation of the vehicle in the event of an electrical stoppage. These controls generally condition the transmission for a forward ratio, such as third, in a five-speed transmission and no other forward operation ratios.

Some controls will permit the manual selection of one forward and one reverse ratio, such that the vehicle can continue to be driven to a place of repair. Other controls will condition the transmission to a high gear ratio if the electrical stoppage occurs at high vehicle speeds to maintain this high gear ratio until the vehicle brought to a halt. After stopping, the vehicle transmission is generally then operable in a single forward ratio or reverse ratio until the electrical stoppage is overcome.

SUMMARY OF THE INVENTION

It is an object of this invention to provide an improved electronically actuated hydraulic control system for a power transmission, wherein manual selection of a plurality of forward ratios and a reverse ratio is permitted in the absence of electrical power.

It is another object of this invention to provide an improved hydraulic control having a plurality of electronically controlled valve means for normally initiating ratio interchanges, wherein an interrupt valve means is provided to permit manual ratio selection when an electrical power discontinuance occurs.

The above objects are accomplished by a single interrupt valve disposed between a manual valve and a plurality of shift valves. During normal operation in the forward drive ratio, except D2, the interrupt valve is spring biased and pressure loaded to an inoperative position. The interrupt valve functions during normal operation when the reverse ratio is selected to direct fluid pressure to at least one of the friction devices which establishes the reverse ratio. This lessens the complexity of the control by reducing the number of conduits or passages and valves required to direct fluid pressure to the friction devices utilized for the low forward ratio and the reverse ratio.

In the event that electrical power to the control valves is interrupted, the interrupt valve acts in conjunction with the manual valve to permit selection of each forward ratio, neutral, park and the reverse ratio. During the electrical interruption, the shifting between forward ratios is accomplished manually.

DESCRIPTION OF AN EXEMPLARY EMBODIMENT

Figure 1A:
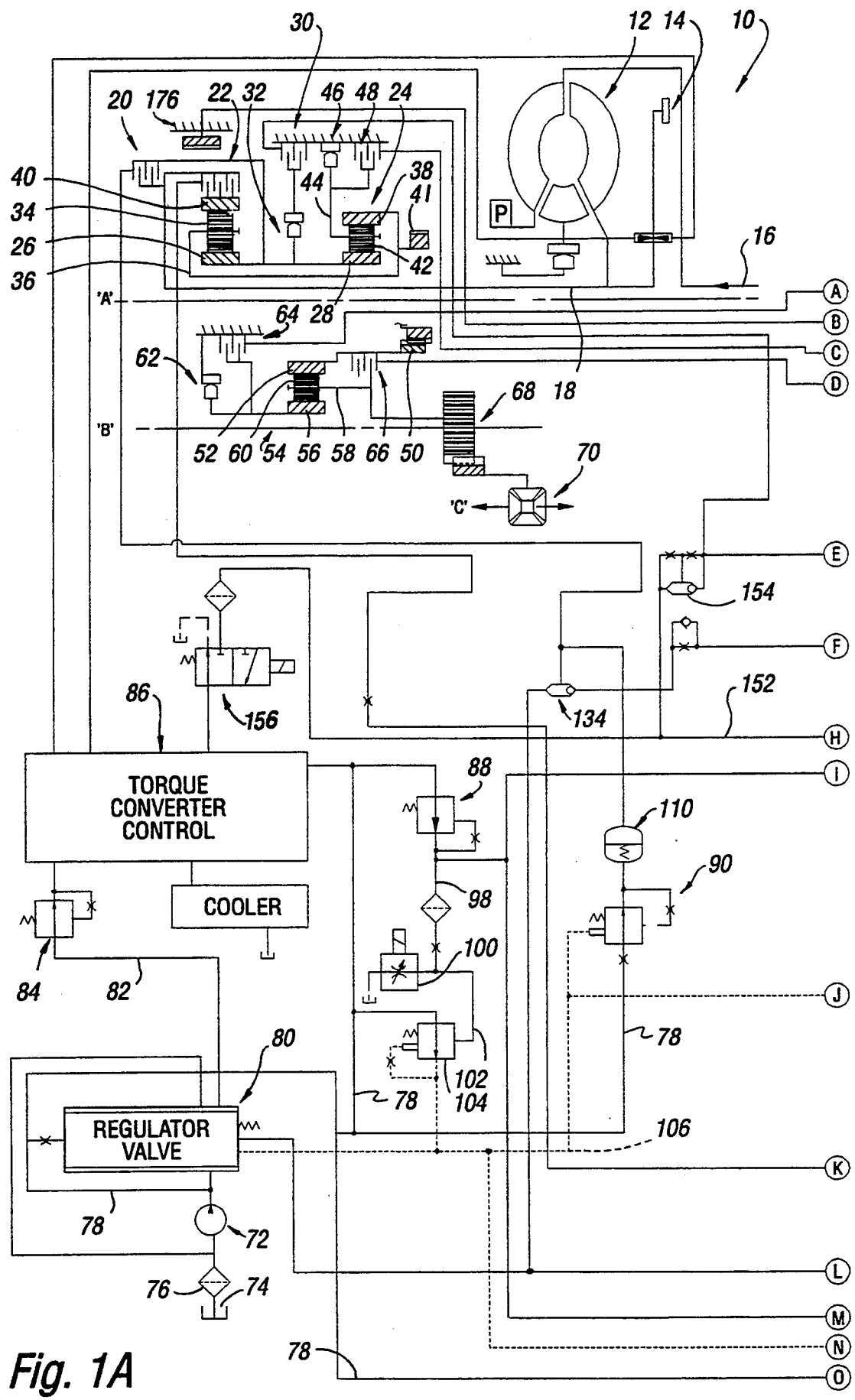
FIG. 1A is a schematic representation of a planetary gear arrangement and a portion of a hydraulic control for establishing ratios within the transmission.

The present invention is directed to controlling a planetary transmission 10, shown in FIG. 1A. The transmission 10 includes a conventional torque converter 12 having a torque converter clutch 14 which, as is well known, is operable to establish a mechanical drive between an input shaft 16 and a transmission input shaft 18.

The transmission input shaft 18 is drivingly connected through a pair of friction clutches 20 and 22 to establish input drive torque to a dual planetary gear arrangement 24. The planetary gear arrangement 24 is a well known arrangement which has been used for a number of years in automotive transmissions. This arrangement 24 includes a pair of sun gears 26, 28 which are selectively connectible with the clutch 20 and therefore the input 18, or selectively connectible to ground by a conventional friction brake 30 and one-way clutch 32.

The sun gear 26 meshes with a plurality of pinion gears 34 rotatably journalled on a carrier 36 which is drivingly connected through a shaft to a ring gear 38 and an output gear 41. The pinions 34 also mesh with a ring gear 40 which is selectively connectible through the clutch 22 to the transmission input shaft 18. The sun gear 28 meshes with a plurality of pinion gears 42 which simultaneously mesh with the ring gear 38. The pinions 42 are rotatably mounted on a carrier 44 which is selectively connectible with a stationary portion of the transmission through a one-way device 46 or a selectively engageable brake member 48.

The planetary gear arrangement 24 is operable to provide three forward speeds and one reverse speed in a well known manner.

The output gear 41 is drivingly connected with another output gear 50 which is, in turn, drivingly connected with a ring gear 52 of a two speed planetary gear set 54. The planetary gear set 54 also includes a sun gear 56 and a carrier 58 on which is rotatably mounted a plurality of pinions 60 meshing with the sun gear 56 and the ring gear 52. The sun gear 56 is selectively grounded to a transmission housing through a one-way device 62 or a selectively engageable friction brake 64.

The carrier 58 is selectively connectible to the ring gear 52 through a selectively engageable friction clutch 66. When the brake 64 or one-way 62 is operable, the planetary gear arrangement 54 provides an underdrive between the ring gear 52 and the carrier 58 which is drivingly connected with a final drive reduction gear set 68 and a differential output 70. When the clutch 66 is engaged, the carrier 58 is directly connectible with the gear 50 such that a 1:1 drive ratio between the transmission output gear 41 and the final drive gear set 68 is provided.

Figure 1B:
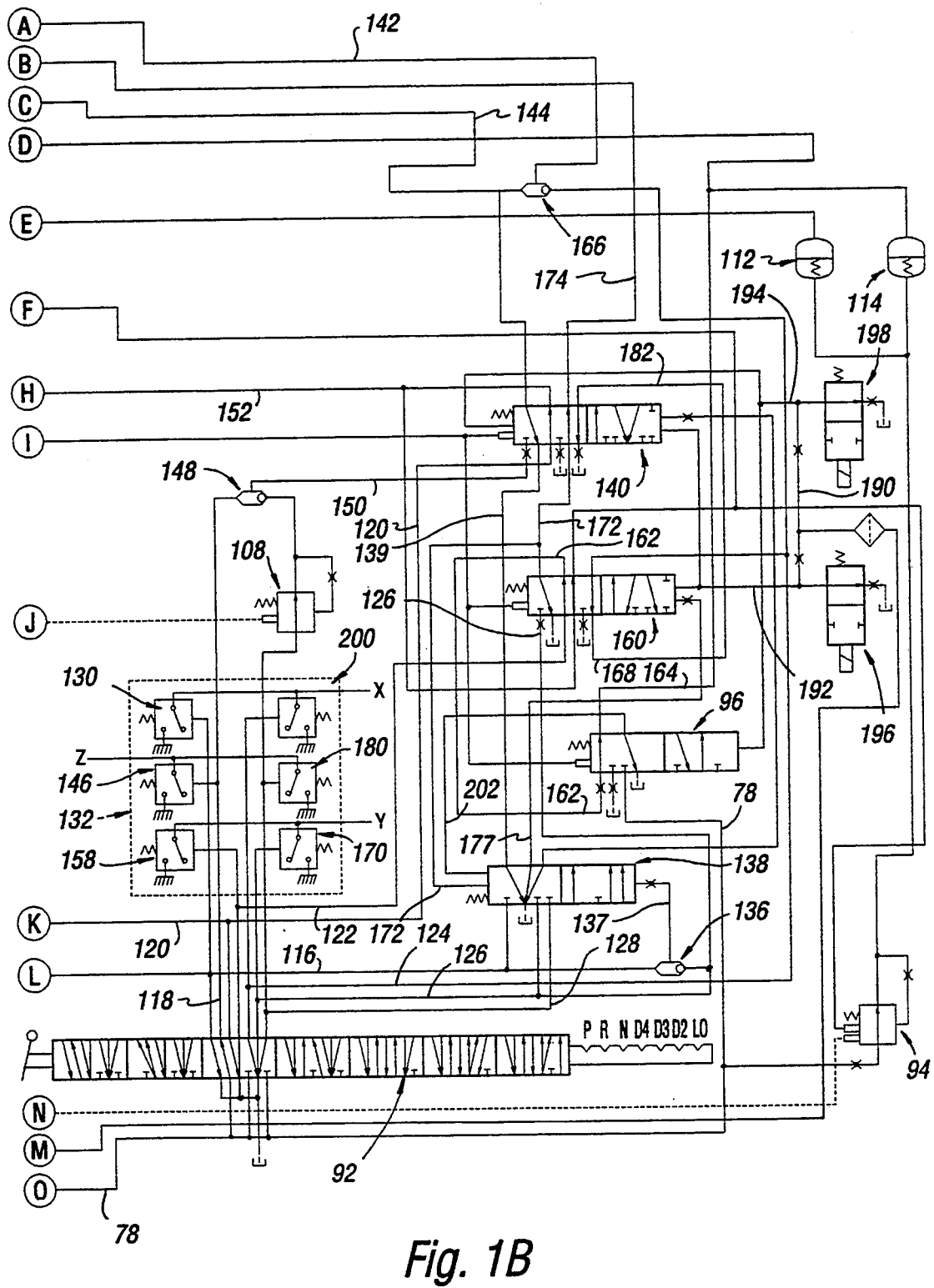
FIG. 1B is a schematic diagram of another portion of the hydraulic control which is operable to provide power to establish the drive ratios within the planetary transmission of FIG. 1A.

The various fluid operated friction clutches and brakes controlling the planetary gear arrangement 24 and the two speed arrangement 54 are controlled by and receive fluid power from a hydraulic control system which is shown in FIGS. 1A and 1B. This hydraulic control system includes a positive displacement hydraulic pump 72 which draws fluid from a reservoir 74 through a filter 76 for delivery to a main line or high pressure passage 78. Fluid pressure in the passage 78 is established by a conventional regulator valve 80 which is effective to direct excess fluid back to the inlet of the pump 72.

The regulator valve 80 is also effective to supply fluid through a secondary passage 82 to a limit valve 84 which, in turn, provides fluid to a conventional torque converter control valve 86. The torque converter control valve 86 is effective to control the engagement and disengagement of the torque converter clutch 14 in a well known manner.

The main pressure passage 78 directs fluid pressure to a limit valve 88, a 2-3 accumulator valve 90, a manual valve 92, a 1-2/3-4 accumulator valve 94 and a 3-4 shift valve 96. The limit valve 88 is a conventional pressure reducing valve which delivers a reduced pressure to a control passage 98 which is connected with a variable bleed solenoid 100. The variable bleed solenoid 100 is effective to provide a torque sensitive control signal in a passage 102 which is connected with a conventional pressure reducing valve 104. The valve 104 supplies a variable torque control signal pressure through a passage 106 to the 2-3 accumulator valve 90, the pressure regulator valve 80, the 1-2/3-4 accumulator valve 94 and a low range reducing valve 108.

This pressure signal in passage 106 is proportional to the engine torque output and is utilized to control the pressure outputs of the various valves in response to torque changes at the engine.

The 2-3 accumulator valve 90 and the 1-2/3-4 accumulator valve 94 are effective to control the bias pressures on a 2-3 accumulator 110, a 1-2 accumulator 112 and a 3-4 accumulator 114, respectively.

As is well known, the accumulators 110, 112 and 114 are effective to control the pressure rise in various friction devices. The accumulator 110, for example, is effective to control the pressure rise during engagement in the clutch 20. The accumulator 112 is effective to control the pressure rise in the brake 30. The accumulator 114 is effective to control the pressure rise in the clutch 66. The usefulness and function of these systems is well known and it is not believed that a further description is required at this point.

The manual valve 92 is manually shiftable to a plurality of drive conditions including Park "P", Reverse "R", Neutral "N", Drive 4 "D4", Drive 3 "D3", Drive 2 "D2" and Lo or Drive 1. These types of valves are well known and their general purpose is to direct fluid from the main pressure passage 78 to a plurality of drive passages or to exhaust the drive passages. The valve 92 is connected with a Reverse passage 116, a Park-Reverse-Neutral passage 118, a Forward passage 120, a D4 passage 122, a D3-2-1 passage 124, a D2-1 passage 126, and a Lo passage or D1 passage 128.

The Reverse passage 116 is in fluid communication with a pressure switch 130 and an electrical switch manifold assembly 132. The passage 116 is also in fluid communication with the clutch 20 through a conventional shuttle valve 134. The pressure in passage 116, when directed to the clutch 20, will establish the sun gears 26 and 28 as input members of the planetary gear arrangement 24.

The pressure in passage 116 also is directed through a conventional shuttle valve 136 to a passage 137 which is connected with a power interrupt valve 138 which is spring loaded to the right as viewed in FIG. 1B. However, when passage 116 is energized or pressurized, power interrupt valve is shifted leftward against the spring, such that the fluid pressure in passage 116 is directed to a passage 139 which passes through a 1-2 shift valve 140 in the spring set position shown, to deliver fluid pressure through a conventional shuttle valve 166 to a passage 142 which controls the engagement of the brake 64 and through a passage 144 which controls engagement of the brake 48. This will place the planetary transmission 24 in reverse ratio and the two speed arrangement 54 in a reduction ratio.

The passage 116 is pressurized whenever the transmission manual valve 92 is in the "R" position and is exhausted at all other conditions. The passage 118 is connected to an electrical switch 146 in the manifold 132 and also through a shuttle valve 148 to a passage 150 which is connected to the 1-2 shift valve 140 which, in the spring set position shown, blocks the passage 150.

The passage 118 is pressurized whenever the manual valve 92 is in the "P" position, the "R" position or the "N" position. The passage 120 is connected with the clutch 22 and the 1-2 shift valve 140. In the spring set position shown, the passage 120 is connected through the shift valve 140 to a passage 152 which, in turn, is connected through a shuttle valve 154 with the brake 30 and to a torque converter control valve 156. The control valve 156 provides a pressure in response to a pulse width modulated solenoid which operates on the torque converter control valve 86 to establish the on/off relationship of the torque converter clutch 14.

When the shift valve 140 is moved by pressure to the pressure set position, the passage 120 is closed. The passage 120 is pressurized whenever the manual valve 92 is in the D4 position, the D3 position, the D2 position or the Lo position. It is exhausted during P-R-N positions.

The D4 passage 122 is connected with an electrical switch 158 in the manifold 132 and with a 2-3 shift valve 160. In the spring set position shown, the passage 122 is connected through the shift valve 160 to a passage 162 which, in turn, is connected to the 3-4 shift valve 96 which, in the spring set position shown, connects the passage 162 with a passage 164 which is connected to the clutch 66 to place the two speed planetary 54 in the high range or 1:1 drive condition.

The D4 passage 122 is pressurized whenever the manual valve is in D4 and is exhausted in all other drive situations or drive set conditions in the manual valve 92.

The D3-2-1 passage 124 is connected through the conventional shuttle valve 166 which, in turn, is connected to the passage 142 which is operable to engage the brake 64 as previously described with the reverse operation.

The passage 124 is also connected to the 2-3 shift valve 160 which, in the spring set position, directs fluid pressure from passage 124 to a passage 168. The passage 168 is connected to the 1-2 shift valve 140 which, in the spring set position shown, connects passage 168 to exhaust and, in the pressure set position, will block the passage 168. The passage 124 is pressurized in the D3, D2 and Lo conditions or operating settings of the manual valve 92.

The D2-1 passage 126 is connected with an electrical switch 170 in the manifold 132, to the power interrupt valve 138 at a port location and through the shuttle valve 136 to a control location and to a port on the 2-3 shift valve 160 which, in the spring set position shown, blocks the passage 124. In the pressure set position, the 2-3 shift valve directs fluid pressure from passage 124 to a passage 172 which is connected with the 1-2 shift valve 140.

In the spring set position shown, the shift valve 140 directs the fluid pressure from passage 172 to a passage 174 which is, in turn, connected to operate a friction brake 176 disposed in the planetary gear arrangement 24. The fluid operated brake 176 is effective to hold the sun gears 26 and 28 stationary. When the sun gears 26 and 28 are held stationary and the clutch 22 is engaged, the planetary gear arrangement 24 is in the second forward range condition.

The D2-1 passage 126 is pressurized in the D2 and D1 conditions of the manual valve 92. The fluid pressure in passage 126 will cause the power interrupt valve 138 to move to the pressure set position, such that fluid pressure will be directed through the valve from passage 126 to a passage 177 which is effective to move the 1-2 shift valve to the spring set position which will provide the desired connection to establish the second gear ratio.

The Lo passage 128 is in fluid communication with a switch 180 in the manifold 132 and with the pressure reducing valve 108. The outlet of the pressure reducing valve, as explained previously, is connected to the passage 150 which is connected to the 1-2 shift valve 140 which, in the spring set position shown, blocks the passage 150.

In the pressure set position, the shift valve 140 is effective to direct fluid pressure in passage 150 to shuttle valve 166 which, in turn, is connected to the passage 142 to thereby permit engagement of the brake 64. The passage 128 is pressurized whenever the transmission is conditioned for the low operation by the manual valve 92 and is exhausted in all other situations.

The passage 98, which provides a reduced pressure from the valve 88 which is fed from the main pressure passage 78, is connected to a control passage 190 which, in turn, is connected to a pair of control passages 192 connected with the shift valve 160 and shift valve 140 and with a control passage 194 which is connected with the shift valve 140 and the shift valve 96. The passage 98 is also connected to a control area on each of the shift valves 140, 160 and 96.

Fluid pressure in passage 192 is controlled by an on/off solenoid 196 while the fluid pressure in passage 194 is controlled by an on/off solenoid 198. The use of solenoid valves 196 and 198 to control the signal pressure to a shift valve is well known and has been utilized in a number of applications.

When the solenoid 196 is energized, the shift valves 160 and 140 will be moved to the pressure set position which is the first ratio position for these shift valves. When the solenoid valve 198 is energized, the shift valve 140 will be moved to the spring set position, due to a pressure bias on both sides thereof, which will establish the 1-2 shift valve in the position desired for second, third and fourth.

The energization of solenoid 198 will also move the shift valve 96 to the pressure set position, which is the desired location for second and third gear operation. Thus, in first gear, the solenoid 196 is energized. In second gear, both solenoids 196 and 198 are energized. In third gear, solenoid 198 is energized and in fourth gear, no solenoid is energized.

The manifold 132 housing the electrical switches is effective to permit a control signal to be delivered to a conventional digital computer or CPU to control the operation of the transmission and the energization of the various solenoids therein. The manifold 132 has three electrical outlets or channels X, Y and Z, which are electrically energized depending upon the condition of the transmission.

In D1, switches 170, 180 and 200 are closed which provides a ground signal for all three channels X, Y and Z. In D2, the switches 170 and 200 are closed which provides ground conditions for channels X and Y while channel Z is not grounded. In D3, only switch 200 is closed which provides a ground signal for channel X. In D4 or Drive, the switch 158 is closed which provides a ground signal or channel Y. In neutral, the switch 146 is closed which provides a ground signal for channel Z. This is also true in Park.

In Reverse, switches 146 and 130 are closed which provides ground signals for channels X and Z. Thus, it can be seen that each individual drive condition has a unique signal bias.

However, when an electrical stoppage occurs for some reason, the digital computer or CPU generally controlling the transmission will not be receiving power and therefore the electrical shift mechanism which controls the ratio interchanges will not be available. When this occurs, the power interrupt valve 138 is effective to provide each of the drive ranges through manual selection in cooperation with the manual valve 92. If the operator places the manual valve in either Park or Neutral, no drive will occur which is the normal condition with or without electrical power. If the driver or operate selects reverse, the passages 116 and 118 are pressurized which, as previously described, will cause actuation of brakes 64, brake 48 and clutch 20.

If the operator moves the manual valve 92 to the Drive 4 position, the forward passage 120 and the D4 passage 122 are pressurized which, as previously described, will place the planetary gear arrangement in the fourth forward drive ratio by engaging the clutch 22, clutch 20 and clutch 66.

In the D3 position of the manual valve, passages 120 and 124 are pressurized which will condition the transmission for the third forward ratio by engaging clutches 20 and 22 and brake 64.

If the manual valve 92 is moved to the D2 position, passage 126 is pressurized which, as previously described, is effective to move the power interrupt valve to the pressure set position thereby providing fluid connections necessary to establish the second forward ratio within a transmission wherein the clutch 22 and brake 30 are pressurized.

In the D1 position, the forward passage 120 is pressurized which causes engagement of clutch 22 and through the operation of one-way brake 46, the low gear operation or first gear operation is attained. During operation of the power interrupt valve 138, the appropriate coast brakes 64, 48, 176 are engaged.

During normal electrical control operation, the power interrupt valve 138 is maintained in the spring set position by pressure in passage 172 or pressure in a passage 202. The pressure in passage 202 is delivered from line pressure 78 through the 3-4 shift valve whenever the second or third pressure set position of the valve is attained. Thus, in either second or third gear, the power interrupt valve 138 cannot be shifted from its spring set position.

The passage 172 is pressurized whenever the shift valve 160 is in the pressure set or first or second gear position, therefore the power interrupt valve 138 cannot be moved whenever first, second or third gear operation has been requested by the normal electronic control mechanism. During reverse operation, however, fluid pressure in passage 137 will move the valve 138 to the pressure set position for reverse operation of the transmission 10.

Thus, from the foregoing description, it should be now apparent that the addition of the power interrupt valve permits a normally electronically controlled transmission to be manipulated in all forward ratios by manual selection and in the reverse ratio by manual selection.

The embodiments of the invention in which an exclusive property or privilege is claimed are defined as follows:

1. A hydraulic control for a transmission comprising:
   a source of fluid pressure;
   means for automatically changing ratios in a transmission sequentially through a plurality of at least four ratios from a low ratio to a high ratio including electrically operated control means;
   shift valves normally controlled by said electrically operated control means to establish shifted and unshifted positions to establish said ratios;
   manual valve means for selectively directing pressure from the source to the shift valves; and
   a power interruption valve for selectively directing fluid pressure to the shift valves from said manual valve means when electrical power to the electrically operated control means is interrupted for selectively controlling the shift valves to establish shifted and unshifted positions to permit manual selection of individual ones of the plurality of ratios.

2. The hydraulic control defined in claim 1, wherein said manual valve means is movable to a reverse drive position wherein fluid pressure is directed to said power interruption valve means to provide proper distribution to establish the transmission for a reverse ratio.

* * * * *